March 17, 1959  T. A. FJELLSTEDT  2,878,331
SWITCH GROUP OPERATING MECHANISM
Filed Feb. 11, 1954  6 Sheets-Sheet 1

INVENTOR.
Thorsten A. Fjellstedt
BY
Attorney

March 17, 1959  T. A. FJELLSTEDT  2,878,331
SWITCH GROUP OPERATING MECHANISM
Filed Feb. 11, 1954  6 Sheets-Sheet 2
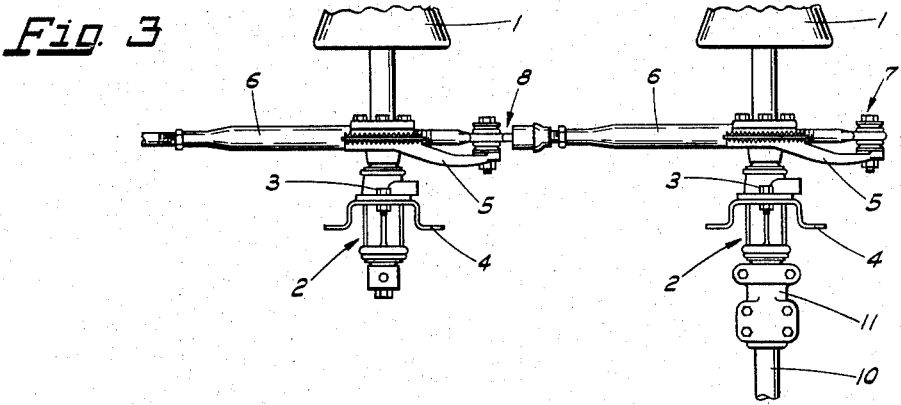
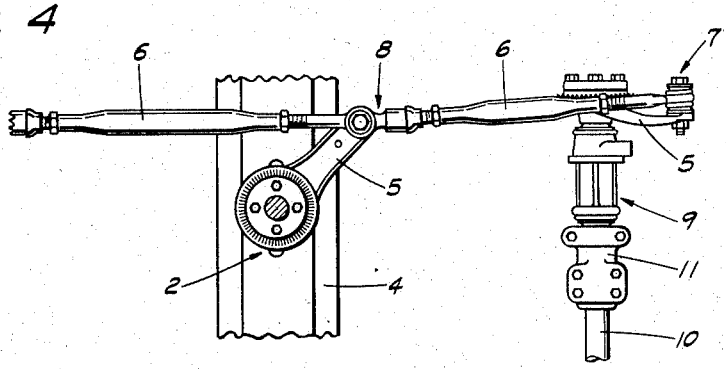
INVENTOR.
Thorsten A. Fjellstedt
BY
Attorney March 17, 1959  T. A. FJELLSTEDT  2,878,331
SWITCH GROUP OPERATING MECHANISM
Filed Feb. 11, 1954  6 Sheets-Sheet 3
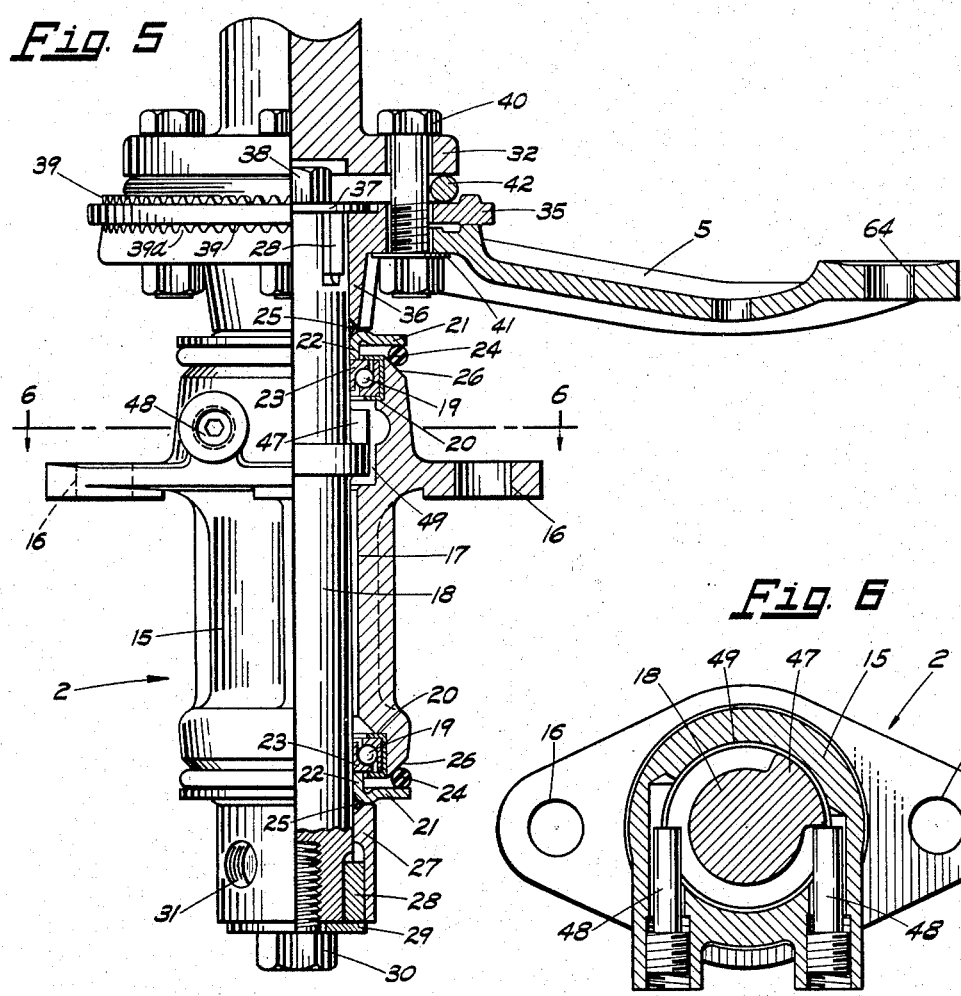
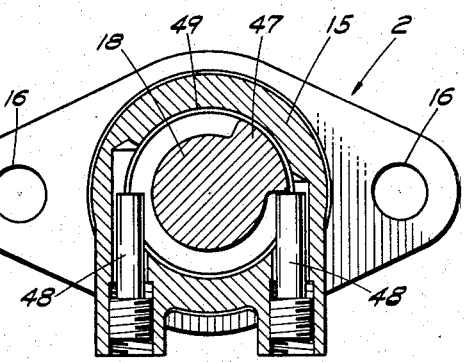
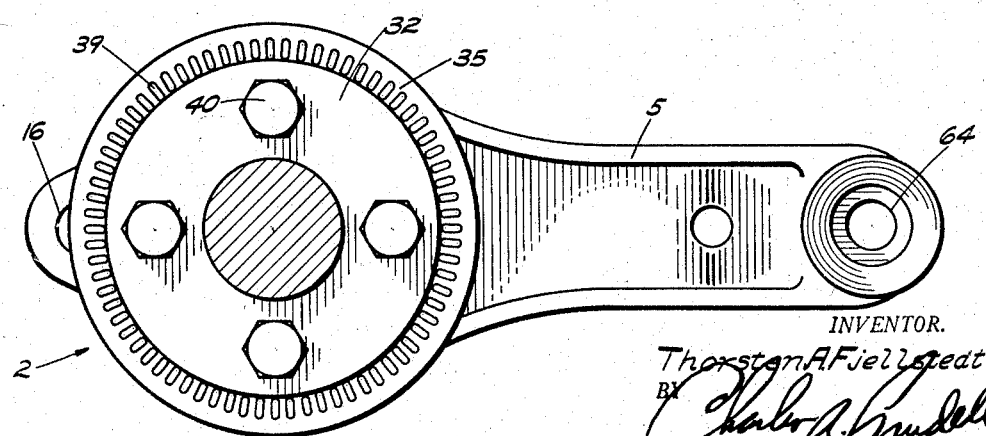
INVENTOR.
Thorsten A Fjellstedt
BY Charles A. Grindell
Attorney March 17, 1959  T. A. FJELLSTEDT  2,878,331
SWITCH GROUP OPERATING MECHANISM
Filed Feb. 11, 1954  6 Sheets-Sheet 4
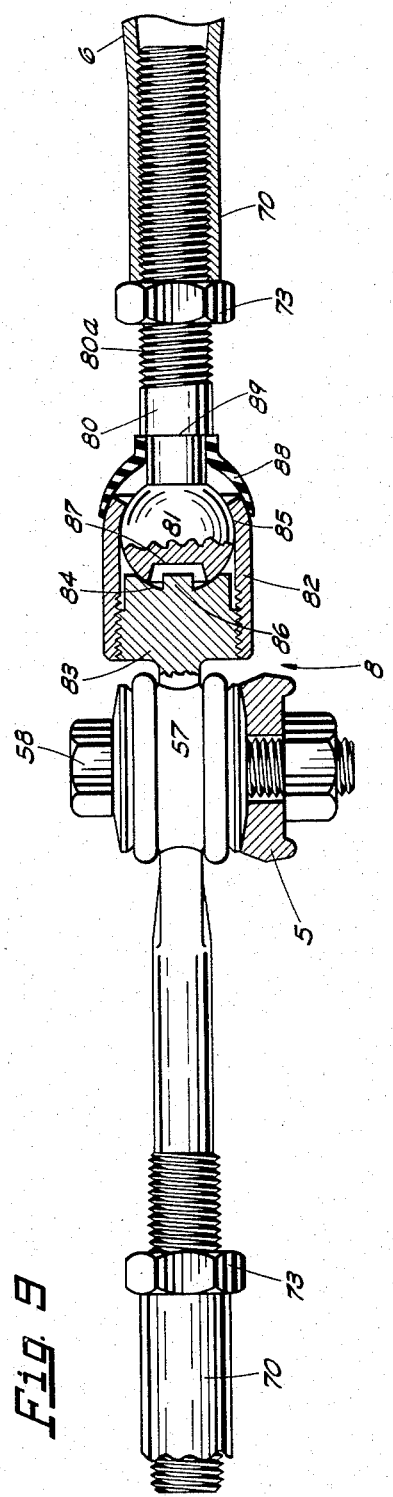
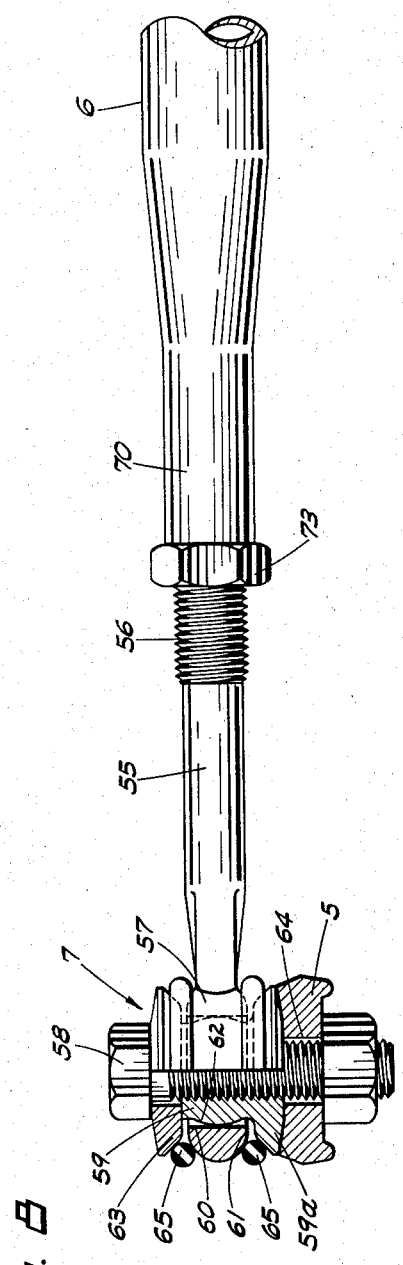
INVENTOR.
Thorsten A. Fjellstedt
BY
Charles A. Grudell
Attorney

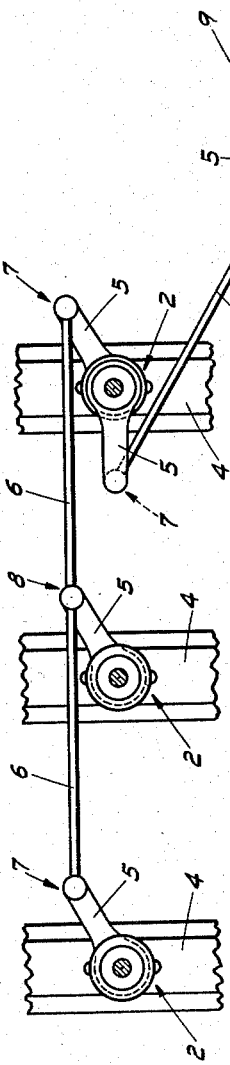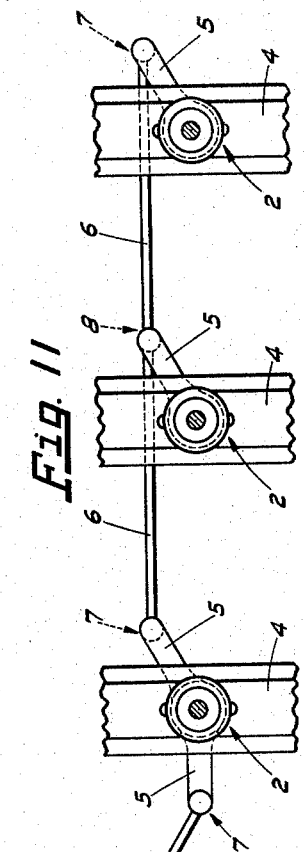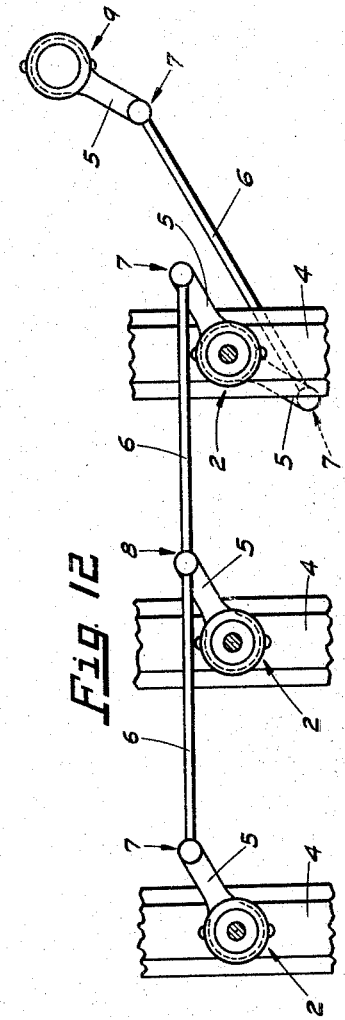

March 17, 1959   T. A. FJELLSTEDT   2,878,331
SWITCH GROUP OPERATING MECHANISM
Filed Feb. 11, 1954   6 Sheets-Sheet 6

INVENTOR.
Thorsten A. Fjellstedt
BY
Attorney

United States Patent Office 2,878,331
Patented Mar. 17, 1959

2,878,331

SWITCH GROUP OPERATING MECHANISM

Thorsten A. Fjellstedt, Ingleside, Ill., assignor to McGraw-Edison Company, a corporation of Delaware Application February 11, 1954, Serial No. 409,694

2 Claims. (Cl. 200—48)

This invention relates to electric switch operating mechanism and has particular reference to synchronously operating a plurality of switches in a three phase circuit from a remote position.

One of the objects of this invention is to provide a bearing structure especially adapted to revolvably carry a high voltage insulator stack which when rotated may actuate a switch blade positioning mechanism.

Another object is to provide the bearing structure with a totally enclosed adjustable stop for establishing definite limits to the axial rotation of the insulator stack and to so design the stop so that it is unaffected by ice or other interference.

Still another object is to construct the bearing so that dirt and corrosive elements may not enter therein to impair its operating characteristics.

A further object is to provide means for easily attaining and thereafter assuring synchronous rotation of a plurality of insulator stacks by employment of a versatile interphase mechanism for connecting angularly adjustable operating levers on each insulator stack.

A still further object is to so construct the interphase connecting mechanism that it may readily compensate for appreciable misalignment between the switches in any plane without developing shearing or excessive bearing stresses between relatively movable parts.

Another object of this invention is to provide a switch operating mechanism which has a minimum of lost motion in the operating mechanism between insulator stacks and in which all movable parts are lubricated and protectively sealed against grit, water, and ice.

Another object is to provide an interphase mechanism which facilitates manual or mechanical operation of a switch or switch group from a variety of positions by simply changing the arrangement of the component parts thereof.

Other objects will appear throughout the course of the following specification.

For convenience in describing the invention, reference is made to the following drawings in which:

Fig. 3 is an elevation view of an alternative arrangement of the novel switch operating mechanism.

Fig. 4 is an elevation view of another alternative arrangement of the switch operating mechanism.

Fig. 5 is an elevation view of a main bearing structure, partly in section.

Fig. 6 is a sectional view taken on the line 6—6 in Fig. 5.

Fig. 7 is a top view of the structure shown in Fig. 5.

Fig. 8 is an elevation view, partly in section, of the end yoke assembly.

Fig. 9 is an elevation view, partly in section, of the ball and yoke assembly.

Figs. 10 through 12 schematically show alternative arrangements of the invention.

Figs. 13 through 16 schematically illustrate alternative arrangements of the operating levers relative to the main bearing structure.

Figure 1:
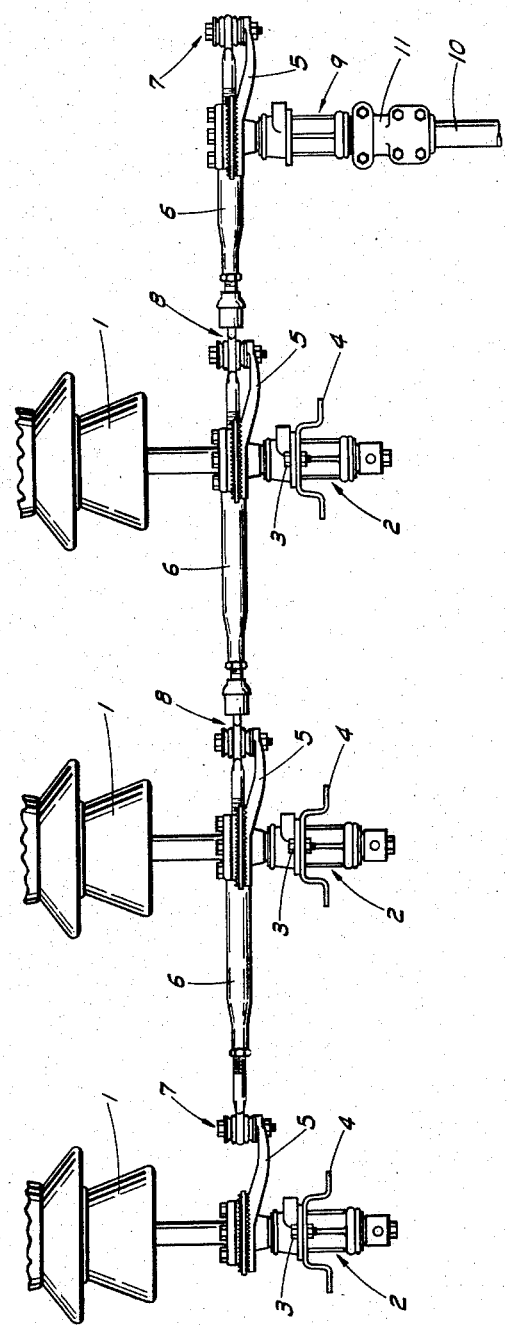
Fig. 1 is an elevation view of one embodiment of the novel switch operating mechanism.
Figure 13:
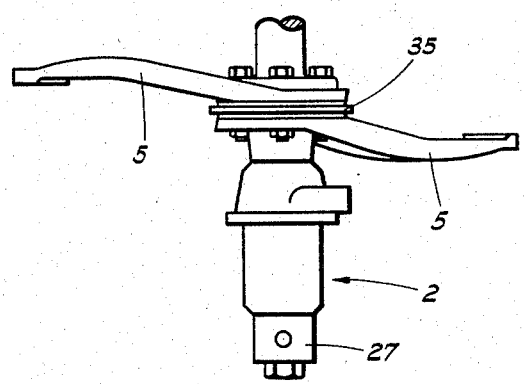
Figure 14:
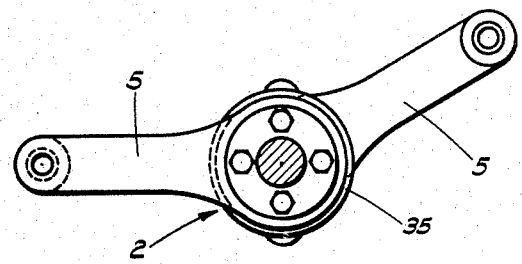
Figure 15:
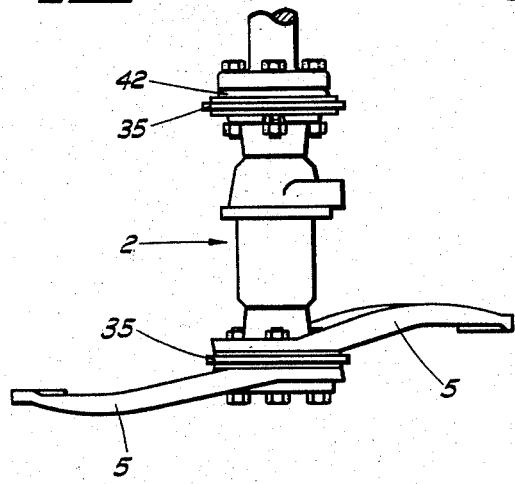
Figure 16:
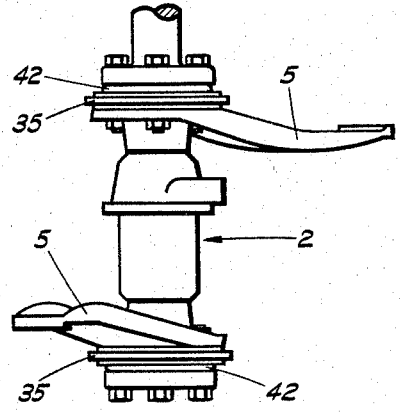

Fig. 1 illustrates the switch operating mechanism arranged to simultaneously rotate three insulator stacks which would normally carry electrical switches (not shown). When arranged according to Fig. 1, the switches are generally designated as being horizontally mounted by reason of the switch blade assuming a horizontal position when closed although the rotating insulator is disposed vertically with reference thereto. Moreover, it should be appreciated that Figs. 1 and 2 merely serve as one illustrative arrangement and that other arrangements such as are shown in Figs. 3, 4, 10, 11, and 12 are contemplated by this invention.

For convenience in describing the switch operating mechanism, the principal parts will be identified in their general form in relation to Figs. 1, 2, 3, and 4. The component parts will be described in detail thereafter.

Referring to Fig. 1 a three phase group of insulator stacks 1 may be seen mounted side by side in spaced relationship on individual main bearing assemblies 2. Each main bearing assembly 2 is secured by bolts 3 to a channel 4 which may in turn be carried by any suitable mounting framework of wood or metal as typically employed in electrical construction.

Each main bearing assembly 2 has an operating lever 5 at its upper end engaged with and adapted to turn the main bearing 2 and its accompanying insulator stack 1.

Interconnection between the operating levers 5 is accomplished through an articulated interphase assembly comprising a plurality of turnbuckle pipes 6 threadedly engaged to a self aligning end yoke assembly 7 pivotally bolted to the ends of levers 5.

To permit unretarded operation of a group of rotating insulator stacks 1, such as is illustrated in Figs. 1, 2, 3, and 4 when the stacks are staggered in horizontal or vertical misalignment, a ball and yoke assembly 8 is interposed within the articulated interphase assembly. The ball and yoke assembly 8 is capable of universal movement, within limits ordinarily encountered in practice, to compensate for misalignment as will be more fully explained later with reference to Fig. 9.

Figure 2:
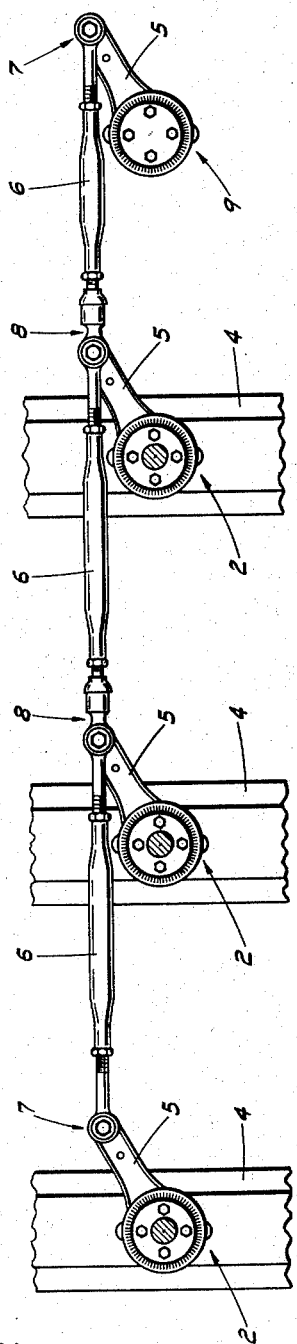
Fig. 2 is a top view of the arrangement shown in Fig. 1 partly in section.

Figs. 1, 2, and 4 further illustrate how the insulator stacks 1 may be operated from a position sidewise from the insulator group by placing an outboard bearing assembly 9, shown herein constructed similarly to main bearing 2, and by interconnecting its operating lever 5 to the interphase mechanism by means of an end yoke 7. With this arrangement, motive torque may be applied to turn the outboard bearing 9 by means of a vertical shaft 10 coupled to the bearing 9 through coupling 11, thereby causing the levers 5 to rotate the main bearings 2 in unison. Obviously, extending the length of the turnbuckle pipe 6 connected to the outboard bearing 9 will permit displacing the bearing 9 laterally to any convenient distance from the rotating insulator stacks 1.

Attention is now directed specifically to Fig. 4 which shows a modification in the arrangement of the main bearing 2 in relation to the outboard bearing 9. Here the main switch bearing 2 is shown with its axis disposed in a horizontal plane normal to the paper such as is the case when the switches (not shown) are vertically mounted and the outboard bearing 9 is shown with its axis disposed vertically as in Fig. 1. With this arrangement it is possible to rotate the main bearings 2 with their axes horizontally disposed by means of an outboard bearing with its axis lying in a vertical plane. Note, however, that it is possible to position the outboard bearing 9 with its axis disposed in any one of an infinite number of positions in a plane substantially normal to the plane of the paper. This universality of positioning the outboard bearing is facilitated by reason of it being connected to its adjacent main bearing 2 through the novel ball assembly 8 which is free to rotate axially through an angle of 360°. Moreover, the flexibility of arrangement inherent in this switch operating mechanism permits its convenient adaptation to switches mounted overhead, such as on a pole top, as well as to switches mounted in the same horizontal plane as the operator as is often convenient in substation installations. Advantages over prior art switch operating mechanisms are especially apparent when it is recognized that the instant invention permits versatility of arrangement without requiring substitution of components or on-the-job drilling and tapping of holes.

An alternative method of rotating the insulator stacks 1 on the main bearings 2 lies in directly connecting a shaft 10 through a coupling 11 to any of the main bearings 2 such as is illustrated in Fig. 3 where the main bearing 2 farthest to the right has been selected to receive the torque for rotating the entire group of insulator stacks although at times it may be convenient to select another bearing where structural supporting members interfere with the operating shaft 10. When the stacks 1 are directly operated as described it is, of course, possible to eliminate the outboard bearing 9 and its related parts as shown by Fig. 3.

Note in Fig. 4 that the axes of the interphase pipes 6 there shown are askew with respect to each other from their point of intersection within ball assembly 8. This apparent misalignment is corrected when the operating lever 5 is rotated counterclockwise so that its end rises with respect to its center of rotation, thereby realigning the axis of each pipe 6. The flexibility necessary to permit misalignment and realignment of the interphase pipes 6, without developing abnormal bearing stresses between the component interconnecting parts, is, of course, an inherent characteristic of the ball assembly 8 and the end yoke assembly 7 as will be explained more fully hereinafter.

Having thus described the general array of the switch operating mechanism, further explanation will now relate to specific construction of the component parts. For that purpose, attention is directed to Figs. 5, 6, and 7 where appear detailed views of a main bearing assembly 2. The main bearing comprises a galvanized metal housing 15 having a mounting flange integral therewith for bolting the housing through holes 16 to any appropriate switch supporting means such as channel 4.

A bore 17 within housing 15 receives therethrough a shaft 18 which is revolvably carried on ball bearings 19 tightly pressed thereon and resting against shoulders 20 at each end of the housing 15. It is preferable to pack the entire bore 17 about the ball bearings 19 and shaft 18 with a high grade silicone base grease as permanent lubrication and to assure exclusion of foreign matter from the interior of the bearing housing 15.

Bearing retainers 21 are slipped over shaft 18 adjacent each end of housing 15. Each retainer 21 has its inner margin depressed to form an annular depending lip 22 which bears against and turns with inner bearing race 23, thereby retaining the bearings 19 against shoulders 20 at all times.

As a precaution against entry of dirt into the housing 15 and against leakage of grease along shaft 18, a resilient cord ring 25, preferably of silicone rubber, is placed over shaft 18 above retainers 21. Another cord ring 24 of similar material is placed on the outside of retainers 21 in contact relation with the retainer and a smoothly machined beveled edge 26 at each end of the housing 15. Cord rings 24 are positioned as shown in Fig. 5 while in a prestretched condition so that they seat tightly against bevel 26, thereby effecting a constant seal between the housing 15 and retainers 21 although the retainers revolve relative to the housing. To reduce friction and increase the efficiency of the seal, cord rings 24 and 25 may be coated with water repellant silicone grease about their entire surface.

One end of shaft 18 in the main bearing is provided with a removable sleeve 27 which retains and spaces shaft 18 longitudinally within housing 15. A key 28 secures sleeve 27 against rotation on shaft 18 and a washer 29 beneath a cap screw 30 holds the sleeve 27 on the shaft.

Sleeve 27 performs the additional function of acting as an adapter for receiving a clamping coupling 11 as illustrated in Fig. 3 when it is desired to operate the switch group by means of a vertical rod 10 from a position directly underneath the rotating insulator stacks 1. To facilitate positive engagement of the coupling 11 to the sleeve the latter is provided with radial holes 31 engageable with projections (not shown) within the coupling 11.

In order to facilitate connecting an operating lever 5 to shaft 18 and to provide means for mounting the base 32 of an insulator stack for rotation on shaft 18, a face plate 35 is provided. The face plate 35 rotates with shaft 18 and is secured thereto by means of a hub portion 36 integral with the plate and a key 28. A washer 37 held against face plate 35 by a cap screw 38 secures the face plate to the shaft 18 and urges the hub 36 against retainer 21 at the same time confining the sealing cord ring 25.

Positive engagement between the face plate 35 and operating lever 5 is attained by providing the face plate 35 with a plurality of radial serrations 39 at 5° intervals as illustrated clearly in Figs. 5 and 7, which mesh with similar serrations 39a on the lever 5. The face plate 35 and lever 5 are held in firm meshing relation by bolts 40 and a washer 41 on each bolt.

The supporting base 32 of the rotating insulator stack 1 is also secured to the face plate 35 by bolts 40. To provide a smooth bearing surface for the supporting base 32 an annular spacing ring 42 is inserted between the base 32 and face plate 35.

When installing and adjusting a group of rotating insulator stacks 1 occasion may arise when it is desirable to shift the lever 5 circumferentially relative to face plate 35 to obtain proper coordination between the angle of rotation of the insulator stacks 1. This may readily be accomplished with the structure described herein without disassembling any pins, bolts, or other parts as has been the practice heretofore. Rather, in using the bearing structure disclosed herein, it is merely necessary to loosen bolts 40 sufficiently to permit the serrations 39a on the lever 5 and serrations 39 on the face plate 35 to unmesh and clear each other while base 32 stands firmly on ring 42. The lever 5 can then be shifted in 5° intervals corresponding to the angle between the serrations. Hence, the lever can always be located by this means along in a position within plus or minus 2½° of radial swing. This adjustment may be used in combination with other adjustments, more fully explained hereinafter to assure synchronous rotational movement of the insulator stacks 1.

Further referring to the main bearing structure, attention is directed to Figs. 5 and 6 which most clearly show the ice free stop 47 on shaft 18 used for limiting the arc through which the rotating insulator stack may be revolved. Stop 47 is preferably made integral with the shaft 18 and extends radially therefrom so as to butt against the ends of adjusting screws 48 at each predetermined end of the shaft's radial swing, best seen in Fig. 6. Totally enclosing the stop 47 within an annular cavity 49 in housing 15 permits its unimpeded swing regardless of an accumulation of ice or foreign matter exterior to the bearing housing 15. To adjust the swing angle of shaft 18 within specified limits requires advancing and retracting of set screws 48 relative to the ice free stop 47 as is apparent from Fig. 6.

The main bearing structure 2 has been described principally thus far with respect to Fig. 5. However, it is not to be inferred that the arrangement and disposition of the operating lever 5 is limited to the preferred embodiment illustrated. Rather, the insulator stack operating mechanism is significantly more versatile by reason of it being adaptable to transposition of the operating levers 5 to either end of bearing housing 15 in a plane above or below mounting means such as channels 4 shown in Fig. 1. For this purpose note that the shaft 18 is equal diametrically at each end to permit substitution of a face plate 35 in place of sleeve 27 at the lower end of shaft 18, thereby facilitating connecting an operating lever 5 to the serrated face plate 35. This may be necessary when it is desired to locate the articulated interphase assembly below channels 4 for convenience in avoiding interference by the switch supporting framework (not shown).

The advantages and increased versatility in arranging the switch operating mechanism resulting from being able to connect one or more operating levers 5 to either end of a bearing assembly 2 as described in the immediately preceding paragraph is demonstrated with reference to Figs. 10 through 16.

In Fig. 10 will be seen a group of three insulator stack carrying bearing assemblies 2 actuated by an outboard bearing 9 spaced laterally from and out of alignment with the bearing assemblies 2. In this view both operating levers 5 are connected to the same end of the bearing assembly 2 to form a bell crank arrangement such as illustrated in elevation in Fig. 13 and viewed from the top in Fig. 14. Note that in Fig. 13 the sleeve 27 is retained on the bearing 2 with this arrangement.

Fig. 11 shows the bearing assemblies 2 arranged to be actuated through an outboard bearing 9 disposed to their left side. This figure is further modified with respect to Fig. 10 by forming a bell crank by means of attaching two operating levers 5 to the lower end of a bearing assembly 2 as further illustrated in Fig. 15. As explained heretofore, the levers 5 may be attached to the bearing 2 at its lower end by merely replacing sleeve 27 with a face plate 35 to which the levers may be clampingly engaged.

Fig. 12 shows an additional modification, although it by no means exhausts the possible modifications. Here a bell crank is formed by attaching the levers 5 to opposite ends of the bearing assembly 2 such as is further shown in Fig. 16 in elevation. This arrangement is accomplished by providing each end of the bearing assembly 2 with a face plate 35 to which the levers 5 may be bolted.

Thus, it will be seen that an almost infinite number of arrangements of the switch group operating mechanism can be attained by simply shifting and rearranging identical parts forming the interphase operating mechanism without resorting to any on-the-job operations such as drilling of holes or welding as prior art devices often require to afford rearrangement. Further, the outboard bearings 9 and main bearings 2 may have their axes disposed in any relative position with respect to each other by simply interconnecting them through completely revolvable ball and yoke assemblies 8 such as shown in Figs. 1 and 2 and described in detail hereinafter.

As is evident from Fig. 1 each operating lever 5 carried by each main bearing 2 is pivotally connected to the articulated interphase mechanism by means of a novel end yoke assembly 7 or a ball and yoke assembly 8. Refer now to Fig. 8 where the end yoke assembly 7 is shown in detail. It will be seen to comprise a rod like member 55 terminating in a threaded portion 56 at one end and an annular yoke portion 57 at the other end. To minimize friction and compensate for misalignment between the insulator stacks 1, the operating lever 5 is connected to yoke 57 by means of a bolt 58 surrounded by a self aligning bearing gland 59 movably confined within hole 60 through yoke 57. The bearing gland 59 has an integral annular beveled flanged retainer portion 59a extending outwardly of bore 60 adjacent one face 61 of the yoke 57. The outer arcuate periphery 62 of the gland disposed within bore 60 is toroidal and similar to a bored sphere which has been cut transversely of the bore by two spaced parallel planes. Since all diameters of a sphere are equal the outer periphery 62 will always contact inner walls of hole 60 in the yoke because the hole has a diameter substantially equal to the diameter of the sphere. Hence, the end yoke 57 permits considerable axial misalignment above and below the horizontal plane without binding or developing free play. To secure gland 59 within yoke 57 a separable gland retainer 63 is provided having a configuration similar to the integral beveled portion 59a on the gland. The end yoke 57 is fastened to operating levers 5 by means of bolt 58 passing through the gland 59 and a hole 64 in the end of the lever 5. Regardless of how tightly the lever 5 is bolted to the end yoke 57 its free pivotal movement will be unaffected because the stresses set up thereby are absorbed by gland 59 without being transmitted to yoke 57.

Prior to final assembly, the end yoke 57 is fully packed with a water resistant silicone grease. Prestretched silicone cord rings 65 are then placed between gland 59 and faces 61 of the end yoke to seal in the grease and to prevent entry of water or other foreign materials, thereby preventing corrosion and accompanying sticky operation of the parts. Corrosion is further inhibited, of course, by heavily hot galvanizing all of the parts.

The end yoke assemblies 7 accompanying each operating lever 5 are interconnected by galvanized interphase turnbuckle pipes which are perforated radially to insure drainage. Each pipe 6 has its ends 70 swaged and internally threaded with respective right and left hand threads corresponding to the thread such as 56 in Fig. 8 on an adjacent end yoke rod 55. By merely turning the pipes 6 in characteristic turnbuckle manner on the pipe axis the interphase mechanism can be easily adjusted to compensate for differences in spacing between the rotating insulator stacks 1 as is evident from inspection of Fig. 1. The pipes 6 are secured against inadvertent rotation by jam nuts 73.

In addition to the end yoke assembly 7 just described a ball and yoke assembly 8, shown generally in Fig. 1, is provided for the purpose of compensating for further misalignment between the rotatable insulators 1 in the articulated interphase assembly.

Refer now to Fig. 9 where the ball and yoke assembly 8 is illustrated in detail. It is seen to comprise a stud 80 having a right hand thread 80a at one end screwed into and locked by a nut 73 against a turnbuckle pipe 6 which connects the assembly with the next adjacent operating lever 5. At the other end of the stud 80 is a ball 81 received by a shell like socket 82 threaded to a plug 83 for transmitting force to the operating lever 5 disposed on the other side of the ball and yoke assembly 8.

The ball portion 81 is retained in close bearing relation to a smooth arcuate face 84 of the plug 83 by the curved margin 85 of socket 82, thereby permitting the ball 81 to swivel relative to the plug 83 without parting therefrom so as to develop free play. After socket 82 is turned onto threaded plug 83 it may be staked or indented in an appropriate threadless recess (not shown) to prevent unscrewing from the plug.

Observe how the degree of swivel of the ball and yoke assembly 8 is limited by a cylindrical projection 86 protruding from the arcuate face 84 into a recess 87 in the ball end. Misalignment of the axes of the various interphase pipes 6 will cause the ball 81 to swivel in socket 82 until the walls of recess 87 contact projection 86 on the plug, thereby precluding buckling of the interphase mechanism at the ball and yoke assembly.

In practice it has been found preferable to have the diameter of recess 87 exceed that of projection 86 sufficiently to permit axial misalignment on the order of 15° before the ball is stopped within the socket.

All bearing surfaces and voids within the socket 82 are lubricated by packing with a water resistant silicone grease. A silicone rubber bell shaped seal 88 overlaps the curved socket margin 85 on its external periphery and also fits snugly around stud 80 to prevent leakage of the silicone grease and to prevent contamination of the grease and moving parts by moisture or grit. The seal 88 is held against sliding on stud 80 by an annular shoulder 89. Since the seal is elastic it fits snugly over margin 85, but it does not distort or part from the socket when the ball 81 swivels because the arcuate contour of seal 88 has the same center of curvature as ball 81 and the curved margin 85 of the socket 82. Hence, the ball assembly remains tightly sealed regardless of the misalignment of the interphase pipes 6.

The yoke portion 57 of the ball and yoke assembly is also shown in Fig. 9 connected to an end of lever 5 by a bolt 58. To avoid prolixity, the yoke associated with the ball will not be described in detail because its structure is substantially similar to the end yoke assembly 7 described heretofore differing only by presence of the threaded plug 83 used in cooperation with ball 81.

From the aforegoing discussion, it should be apparent that a streamlined switch operating mechanism has been described in which all elements are constructed to withstand adverse environmental conditions by reason of their relatively movable parts being sealably enclosed.

In addition, the mechanism is adaptable to accommodate diversified arrangement and rearrangement of the switches without interchanging the components of the mechanism.

Finally, it should be apparent that off-the-ground adjustments can be made with optimum simplicity because practically every part of the mechanism permits some adjustment without necessitating removal of any pins, nuts, or bolts.

It is claimed:

1. In a group of simultaneously operable spaced switches for a polyphase electric line each including an insulator rotatable on an axis substantially parallel to that of the others and in a plane substantially common to each of said axes, means for simultaneously operating said switches and for compensating for misalignment in three dimensions between said switches, said means including a plurality of bearings, a shaft in each bearing rotatably supporting each insulator respectively, an operating lever engaged with each of said shafts, turnbuckle means disposed between said insulators, an end yoke connecting at least one of said levers to said turnbuckle means, said end yoke having a portion at one end engaged with said turnbuckle means and a ring like portion at its other end, a retainer having an outer arcuate convexly curved periphery, said retainer being disposed within said ring like portion and having its said convexly curved periphery in contact relation with the interior thereof, beveled flanges extending radially from said retainer exteriorly of said ring like portion, and bolt means through said retainer connecting one of said levers, in tight compressive relation with said retainer, whereby said ring like portion may revolve and rock on said convexly curved periphery so that misalignment between said shafts and between said operating levers may be compensated for when synchronous swinging movement thereof is effected through actuation of one of said operating levers.

2. In a group of simultaneously operable spaced switches for a polyphase electric line each including an insulator rotatable on an axis substantially parallel to that of the others and in a plane substantially common to each of said axes, means for simultaneously operating said switches and for compensating for misalignment in three dimensions between said switches, said means including a plurality of bearings a shaft in each bearing rotatably supporting each of said insulators respectively, an operating lever engaged with each of said shafts, an articulated mechanism interconnecting said levers and including elongated interconnecting turnbuckle means and a misalignment compensating ball assembly, said assembly including a stud having a turnbuckle pipe receiving thread at one end and recessed ball at its other end, a threaded plug having an arcuate face in slidable contact relation with the periphery of said ball and having a projection loosely receivable by said recess to thereby limit angular movement between said ball and said plug, a socket threadedly engaged with said plug at one end thereof, said socket having its other end inwardly arced into slidable contact relation with said ball, whereby misalignment between said shafts and between said operating levers will be compensated for when synchronous swinging movement thereof is effected through actuation of one of said operating levers.

References Cited in the file of this patent

UNITED STATES PATENTS

| | | |
|---|---|---|
| 1,305,302 | Munger | June 3, 1919 |
| 1,842,707 | Alsaker et al. | Jan. 26, 1932 |
| 1,923,805 | Alsaka et al. | Aug. 22, 1933 |
| 2,207,683 | Lemmon | July 9, 1940 |
| 2,404,311 | Plank | July 16, 1946 |
| 2,408,200 | De La Mater | Sept. 24, 1946 |
| 2,445,833 | Kraemer et al. | July 27, 1948 |
| 2,582,326 | Gussow | Jan. 15, 1952 |
| 2,669,622 | Owens | Feb. 16, 1954 |

FOREIGN PATENTS

| | | |
|---|---|---|
| 556,463 | Great Britain | Oct. 6, 1943 |